(12) United States Patent
Omri

(10) Patent No.: US 9,151,114 B2
(45) Date of Patent: Oct. 6, 2015

(54) TELESCOPIC LADDER AND LOCKING MECHANISM THEREOF

(76) Inventor: Gilad Omri, Zichron Ya'akov (IL)

( * ) Notice: Subject to any disclaimer, the term of this patent is extended or adjusted under 35 U.S.C. 154(b) by 0 days.

(21) Appl. No.: 14/344,234

(22) PCT Filed: Aug. 30, 2012

(86) PCT No.: PCT/IL2012/050343
§ 371 (c)(1),
(2), (4) Date: Mar. 11, 2014

(87) PCT Pub. No.: WO2013/035094
PCT Pub. Date: Mar. 14, 2013

(65) Prior Publication Data
US 2014/0284140 A1   Sep. 25, 2014

(30) Foreign Application Priority Data
Sep. 11, 2011 (IL) .......................................... 215088

(51) Int. Cl.
*E06C 1/00* (2006.01)
*E06C 7/06* (2006.01)
(Continued)

(52) U.S. Cl.
CPC ... *E06C 7/06* (2013.01); *E06C 1/12* (2013.01); *E06C 1/30* (2013.01); *E06C 1/32* (2013.01);
(Continued)

(58) Field of Classification Search
CPC ............... E06C 1/12; E06C 1/18; E06C 1/22; E06C 1/30; E06C 1/125; E06C 1/32; E06C 7/06; E06C 7/188; E06C 7/50; E06C 5/04; E06C 5/30; E06C 7/08
USPC ............ 269/71, 67, 68, 74; 74/503, 519, 523, 74/569; 403/109.2, 109.6, 378, 379.1, 403/379.5
See application file for complete search history.

(56) References Cited

U.S. PATENT DOCUMENTS 1,045,165 A * 11/1912 Moulton ........................ 182/211
1,955,969 A *  4/1934 Marzolf ......................... 403/107
(Continued)

FOREIGN PATENT DOCUMENTS

BE              890155        3/1982
CN         200971751 Y      11/2007
(Continued)

OTHER PUBLICATIONS

International Search Report for PCT/IL2012/050343 dated Jan. 28, 2013.
(Continued)

*Primary Examiner* — Katherine Mitchell
*Assistant Examiner* — Shiref Mekhaeil
(74) *Attorney, Agent, or Firm* — Paul D. Bianco; Martin Fleit; Fleit Gibbons Gutman Bongini & Bianco PL

(57) ABSTRACT

A locking mechanism for selectively securing and unsecuring the linkage of individual ladder sections of a telescopic ladder. The locking mechanism is shifted into a locked position by pivoting a lever toward a first rotational trajectory, urging a track follower in a first direction along a guiding track, and linearly displacing at least one securing rod into an aperture through multiple ladder sections, securing the linkage of the ladder sections. A lever-securing mechanism form-fittingly secures the lever within a bridge element of the locking mechanism when in a locked position. The locking mechanism is shifted into an unlocked position by pivoting the lever toward a second rotational trajectory opposite the first rotational trajectory, urging the track follower in an opposite direction along the guiding track, and linearly displacing the securing rods out from the aperture through the multiple ladder sections, unsecuring the linkage of the ladder sections.

17 Claims, 16 Drawing Sheets

(51) Int. Cl.

| | |
|---|---|
| *E06C 1/12* | (2006.01) |
| *E06C 1/30* | (2006.01) |
| *E06C 1/32* | (2006.01) |
| *E06C 7/42* | (2006.01) |
| *E06C 7/46* | (2006.01) |
| *E06C 7/48* | (2006.01) |
| *E06C 7/50* | (2006.01) |
| *F16B 7/10* | (2006.01) |

(52) U.S. Cl.
CPC ... *E06C 7/42* (2013.01); *E06C 7/46* (2013.01); *E06C 7/48* (2013.01); *E06C 7/50* (2013.01); *F16B 7/105* (2013.01)

(56) References Cited

U.S. PATENT DOCUMENTS

| | | | |
|---|---|---|---|
| 2,680,395 A * | 6/1954 | Christiansen | 269/110 |
| 3,565,211 A * | 2/1971 | Le Blanc | 182/211 |
| 4,179,225 A * | 12/1979 | Asplund | 403/322.4 |
| 4,353,265 A * | 10/1982 | Lipshield | 74/502.4 |
| 4,407,045 A * | 10/1983 | Boothe | 16/327 |
| 5,078,231 A * | 1/1992 | Davis | 182/107 |
| 5,094,576 A * | 3/1992 | Fredelius | 410/151 |
| 5,378,095 A * | 1/1995 | Shultz | 410/151 |
| 5,769,580 A * | 6/1998 | Purvis | 410/151 |
| 5,855,252 A * | 1/1999 | Vrolyks | 182/214 |
| 5,924,523 A | 7/1999 | Krause | |
| 6,189,654 B1 | 2/2001 | Bailey et al. | |
| 6,698,984 B1 * | 3/2004 | Chen | 410/151 |
| 7,234,203 B2 * | 6/2007 | Latimer et al. | 16/297 |
| 8,708,102 B2 * | 4/2014 | Mickens | 182/127 |
| 2007/0151195 A1 * | 7/2007 | Huang | 52/651.07 |
| 2008/0000723 A1 * | 1/2008 | Kieffer et al. | 182/195 |
| 2011/0247897 A1 * | 10/2011 | Nielsen | 182/195 |
| 2013/0119213 A1 * | 5/2013 | Watson | 248/201 |

FOREIGN PATENT DOCUMENTS

| | | |
|---|---|---|
| DE | 2163766 | 6/1973 |
| DE | 29702653 | 4/1997 |
| DE | 29804327 | 5/1998 |
| DE | 20 2007 009088 | 11/2007 |
| EP | 0243765 | 11/1987 |
| GB | 2277952 | 7/1998 |

OTHER PUBLICATIONS

International Preliminary Report on Patentability for PCT/IL2012/050343 dated Mar. 12, 2014.
Written Opinion for PCT/IL2012/050343 available Mar. 11, 2014.

* cited by examiner

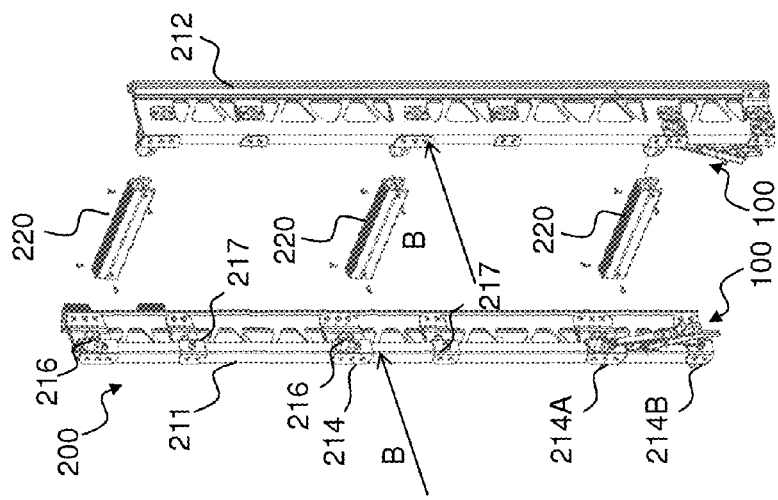
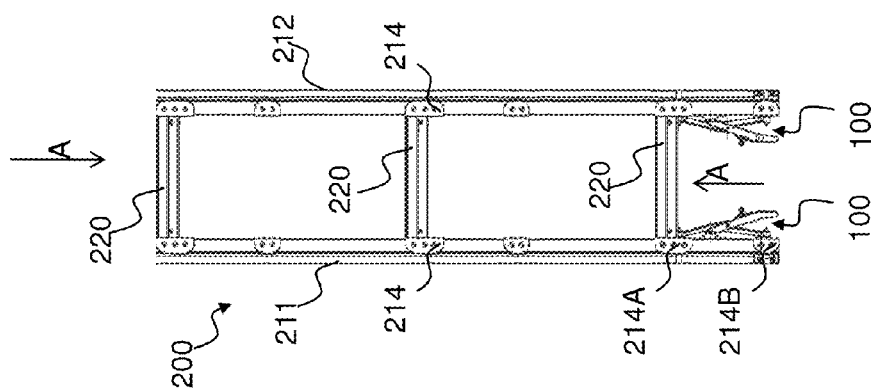
Figure 5B
Figure 5A

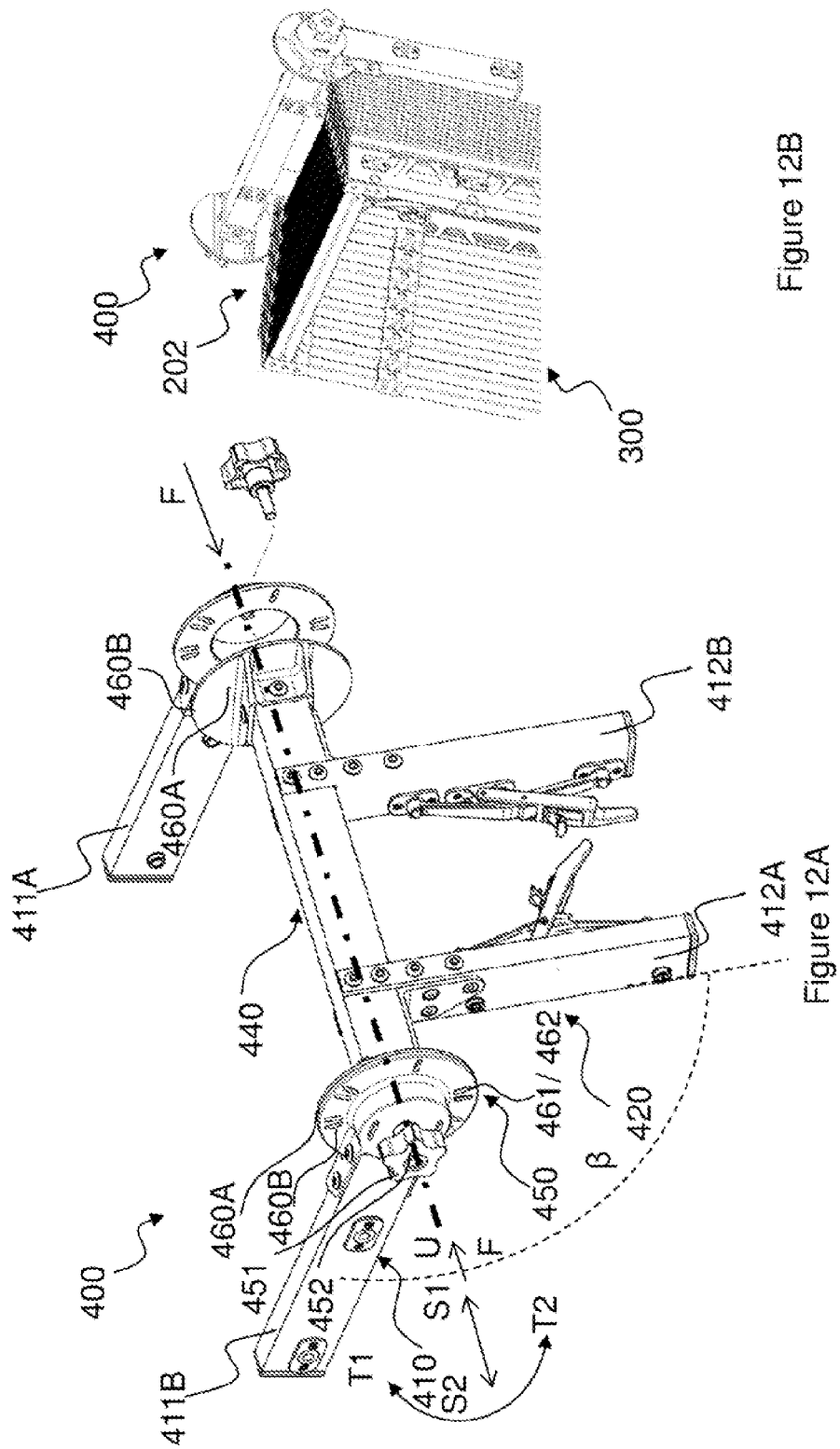

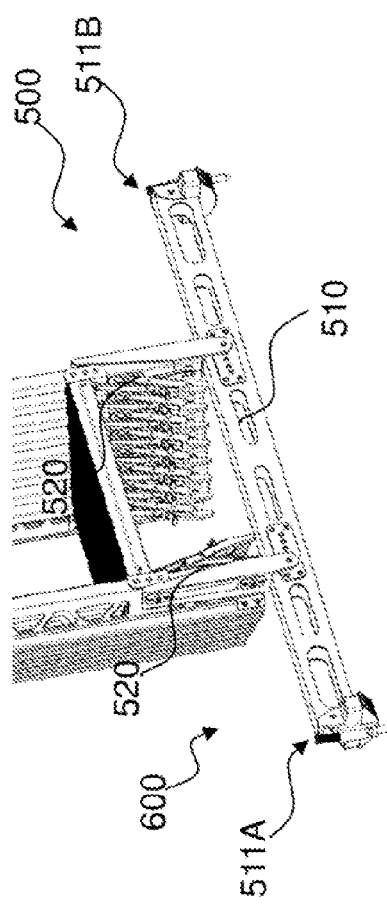
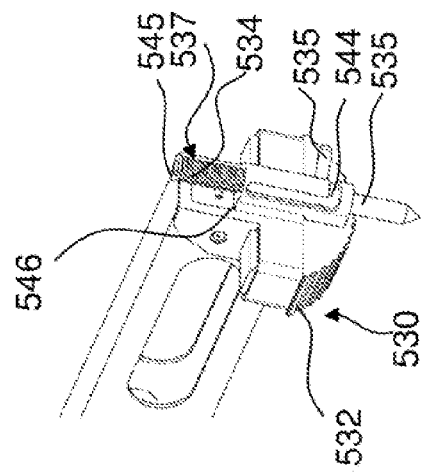
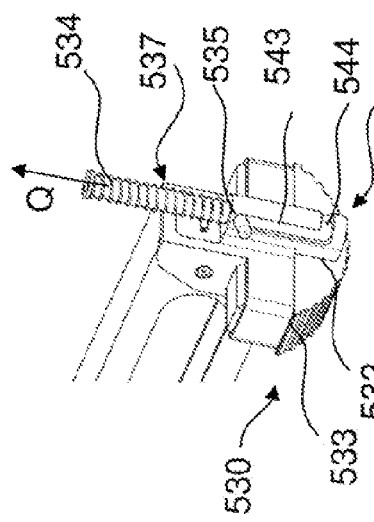
Figure 14A
Figure 14B
Figure 14C

TELESCOPIC LADDER AND LOCKING MECHANISM THEREOF

FIELD OF THE DISCLOSED TECHNIQUE

The disclosed technique relates to the field of ladders, and more particularly to the field of telescopic ladders.

BACKGROUND OF THE DISCLOSED TECHNIQUE

Telescopic ladders include multiple ladder sections, where the ladder is extendable or retractable for adjusting the height of the ladder by sliding the ladder sections relative to one another. Such telescopic ladders may employ a locking mechanism to securely fix the position of a first ladder section relative to a second ladder section, thereby preventing relative movement between the ladder sections, and conversely, to release the first ladder section and second ladder section from their fixed positions, thereby enabling relative movement between the ladder sections.

To date, various types of locking mechanisms for usage in association with telescopic columns or ladders have been proposed.

U.S. Patent Application Publication No. 2007/151195 to Huang, entitled "Telescopic column", discloses a telescopic column that includes a cylinder and a post inserted in the cylinder partially. The post includes a ladder formed thereon. A mount is attached to the cylinder. A positioning element is installed on the mount pivotally. The positioning element includes a dent for engagement with the ladder during an attempt to insert the post into the cylinder and for disengagement from the ladder when the post is extended from the cylinder. A gear is installed on the amount rotationally. A handle is installed on the mount so as to provide pivotal in an active direction and in an idle direction opposite to the active direction. An extending element is installed on the handle movably. The extending element includes a detent for engagement with the gear in the active direction of the pivotal of the handle and for disengagement from the gear in the idle direction of the pivotal of the handle.

U.K. Patent Application No. GB 2,277,952 to Weston, entitled "Catch mechanism", discloses a catch mechanism for mounting on the underside of a rung of a collapsible ladder, comprising a bolt, a spring acting to urge the bolt in a direction to lock two sections of one stile of the ladder to one another in the extended position of the sections and a release lever adapted to be pivotably mounted on the rung for retracting the bolt against the action of the spring. The release lever is pivotably connected to the bolt and the spring for urging the bolt in its locking direction acts between the bolt and the release lever.

U.S. Patent Application Publication No. 2008/000723 to Kieffer et al, entitled "Ergonomic extendable/retractable ladder", discloses an extendable/retractable ladder assembly that includes a first column and a second column. The first column is nested in the second column. A first rung is coupled to and extends from the second column. A ladder assembly bracket includes a collar portion that extends about the second column, and a rung portion that extends from the collar portion into the first rung. The collar portion includes an outer surface and a recess formed in the outer surface, the recess being oriented and having a width to accommodate a portion of a hand grasping about the second column.

U.S. Pat. No. 5,924,523 to Krause, entitled "Adjustable ladder", discloses an adjustable ladder that includes a base ladder and at least one extendable ladder movably fastened to the base ladder. The ladder extension can be locked by a locking bracket pivotally fastened on the extendable ladder. Guide rollers are arranged on the base ladder below a rung, and can be fastened by a first plug element serving as a mounting. The mounting is formed of a wire or rod-shaped blank. The mounting almost completely loops around the hollow section of the rung and is thereby bent in the direction of the rung axis. The mounting can be placed through a hollow axis or tube supporting the guide roller and fastened to a spar of the base ladder. The mounting extends through the spar and projects with a first end piece over the outer cheek or surface of the spar far enough that it can be fixed in the direction of the rung axis.

U.S. Pat. No. 6,189,654 to Bailey et al, entitled "Extension ladder", discloses an extension ladder having a lower ladder section secured to an upper ladder section so that the upper ladder section can be extended relative to the lower ladder section using a ladder extension rope. Both ladder sections include a pair of spaced ladder stiles with rungs, and both ladder sections have the same width. A clutch mechanism extends between the ladder sections and is movable between a locked position, for maintaining the upper ladder section at a desired extension relative to the lower ladder section, and a released position allowing for relative movement of the ladder sections. A clutch locking mechanism biases the clutch mechanism into the locked position. The stiles of each ladder section has formations for securing the sections relative to one another and allowing the upper section to be extended and retracted relative to the lower ladder section.

Chinese Patent Application Publication No. CN 200971751Y to Fan Gang, entitled "Locking device for telescopic ladder", discloses a locking device of a retractable ladder, which includes a lockpin mechanism. The lockpin mechanism includes a pin body, a locating hole and a spring. The locking device is characterized by an unlocking bevel and a locating bevel, which are fixed alternately on the pin body, on a cross piece of adjacent sections. An embedding cooperation part is mounted in correspondence with the unlocking bevel and the locating bevel. The unlocking bevel faces the head of the pin body and inclines to an adjacent section side with a corresponding embedding cooperation part. The facing direction of the locating bevel is the opposite of the unlocking bevel. When an upper one section or lower one section retracts from the current section, the embedding cooperation part of this section props against the unlocking bevel and pushes the pin body to shrink inside and get away from the locating hole, while at the same time, the other embedding cooperation part contacts with the locating bevel for locating.

SUMMARY OF THE DISCLOSED TECHNIQUE

In accordance with one aspect of the disclosed technique, there is thus provided a locking mechanism for selectively securing and unsecuring the linkage of individual ladder sections of a telescopic ladder. The telescopic ladder is extendable or retractable by sliding the ladder sections relative to one another along a longitudinal axis of the ladder. The locking mechanism includes a bridge element, a lever, a guiding track, a track follower, at least one securing rod, and a lever-securing mechanism. The lever is pivotably coupled about an axis perpendicular to the longitudinal axis of the bridge element. The track follower is linearly displaceable along the guiding track. The securing rod is coupled to the bridge element, and is displaceably confined within a respective bore which is coupled with a stile of the ladder sections. The locking mechanism is shifted into a locked position by pivoting the lever toward a first rotational trajectory, urging the track follower in a first direction along the guiding track, and linearly displacing the securing rod into an aperture through multiple ladder sections, securing the linkage of the ladder sections. The lever-securing mechanism form-fittingly secures the lever within the bridge element when the locking mechanism is in a locked position. The locking mechanism is shifted into an unlocked position by pivoting the lever toward a second rotational trajectory opposite the first rotational trajectory, urging the track follower in an opposite direction along the guiding track, and linearly displacing the securing rods out from the aperture through the multiple ladder sections, unsecuring the linkage of the ladder sections. The lever-securing mechanism may be a snap-lock mechanism. The lever-securing mechanism may include a latch having a snap arm at one end, and a bridge element including a hook portion that protrudes outwards and defined a recessed concavity. The snap arm is positioned within the recessed concavity and the hook portion engages the latch to prevent the lever from freely pivoting, when the locking mechanism is in a locked position. The lever-securing mechanism may further include an unlocking assister, operative to apply leverage onto the snap arm to assist unlocking the locking mechanism.

In accordance with another aspect of the disclosed technique, there is thus provided a telescopic ladder including a plurality of individual ladder sections, the telescopic ladder being extendable or retractable by sliding the ladder sections relative to one another along a longitudinal axis of the ladder, each of the ladder sections including a pair of stiles supporting a plurality of rungs. At least one of the ladder sections includes at least one locking mechanism of the disclosed technique, the locking mechanism mounted onto at least one of the stiles, for selectively securing and unsecuring the linkage of the ladder sections of the ladder. The ladder may further include at least one bracket mounted onto at least one of the stiles, the bracket including at least one aperture aligned with an aperture that passes through the stile. The locking mechanism is coupled to the stile via the bracket, such that the securing rod is displaceably confined within the aperture of the bracket. The bracket may further include a rung joint, operative to securely hold an end of a rung of the ladder. A stile of a ladder section may include ladder rails, operative to complementary receive a stile of another ladder section while enabling linear displacement of the stiles relative to one another when the locking mechanism is in an unlocked position. The ladder may include visible marks to facilitate the alignment of the ladder sections into a linkage position. The ladder may further include a head adapter, operative to enable a first ladder section to pivot with respect to a second ladder section. The head adapter may include a first pair of legs, a second pair of legs, a hinge, and a rotational securing arrangement. The first pair of legs are coupleable to the stiles of the first ladder section. The second pair of legs are coupleable to the stiles of the second ladder section. The hinge pivotably couples the first pair of legs and the second pair of legs. The rotational securing arrangement is operative for securing the first pair of legs and the second pair of legs at a fixed angular position. The first pair of legs or the second pair of legs may be coupled to respective stiles via a locking mechanism of the disclosed technique. A respective head adapter may be coupled to a respective distal end of multiple ladder sections of the ladder to form a ladder assembly in a bridge configuration. The ladder may further include a base adapter, operative to provide said ladder with increased engagement stability on a ground surface. The base adapter may include a support arm, connecting arms, and grip elements. The support arm rests on the ground surface. The connecting arms extend perpendicular from the support bar, and are coupleable to the stiles of a ladder section of the ladder. The grip elements are fixedly coupled at respective distal ends of the support bar, and are operative to securely grip the ground surface. The grip element may include a rubber material with a convex-shaped engagement surface. The grip element may include a spike, selectively displaceable to extends toward or retract from the ground surface. The connecting arms of the base adapter may be coupled to respective stiles via a locking mechanism of the disclosed technique. The ladder may include a non-reflective surface or a corrosion resistant surface.

In accordance with a further aspect of the disclosed technique, there is thus provided a telescopic ladder including a plurality of individual ladder sections, the telescopic ladder being extendable or retractable by sliding the ladder sections relative to one another along a longitudinal axis of the ladder, each of the ladder sections including a pair of stiles supporting a plurality of rungs. The cross-sectional profile of at least one of the stiles includes a first corner section, a second corner section, and a connective section. The first corner section is polygon-shaped and hollow, and is situated adjacent to the outer edge of the rungs and extends toward the inner side of the stile. The second corner section is polygon-shaped and hollow, and is situated at an opposite corner of the first corner section and extends toward the outer side of the stile. The connective section extends perpendicular to the rungs along a lateral axis of the stile, and adjoins the first corner section and the second corner section. The cross-sectional profile enables the stiles of at least one inner ladder section to be nested within the stiles of at least one outer ladder section of the telescopic ladder in a fully retracted configuration.

BRIEF DESCRIPTION OF THE DRAWINGS

The disclosed technique will be understood and appreciated more fully from the following detailed description taken in conjunction with the drawings in which:

FIG. 5A is a front view illustration of a ladder section of a telescopic ladder, constructed and operative in accordance with an embodiment of the disclosed technique;

FIG. 5B is a perspective disassembled view illustration of the ladder section of FIG. 5A;

FIG. 12A is a perspective view illustration of a head adapter for a telescopic ladder where the head adapter is in an unfolded position, constructed and operative in accordance with an embodiment of the disclosed technique;

FIG. 12B is a perspective view illustration of the head adapter in a folded position, constructed and operative in accordance with an embodiment of the disclosed technique;

FIG. 14A is a perspective view illustration of a base adapter coupled with a telescopic ladder, constructed and operative in accordance with an embodiment of the disclosed technique;

FIG. 14B is a detailed perspective view illustration of a grip-element of the base adapter of FIG. 14A, the grip-element being in a retracted position;

FIG. 14C is a detailed perspective view illustration of a grip-element of the base adapter of FIG. 14A, the grip-element being in an extended position;

DETAILED DESCRIPTION OF THE EMBODIMENTS

The disclosed technique overcomes the disadvantages of the prior art by providing a unique locking mechanism for selectively securing and unsecuring the linkage of individual sections of a telescopic ladder. The term "telescopic ladder" as used herein refers to a ladder that includes a plurality of individual ladder sections, where the ladder is extendable and retractable by sliding the ladder sections relative to one another along a longitudinal axis of the ladder (i.e., upwards and downwards when the ladder is vertically aligned).

It should be noted that the usage of the indefinite articles "a" and "an" when introducing a feature should not be interpreted as there being only one of that feature. Accordingly, the indefinite articles "a" and "an" as used herein encompass the meaning of the phrase "at least one" of the same feature.

Figure 1:
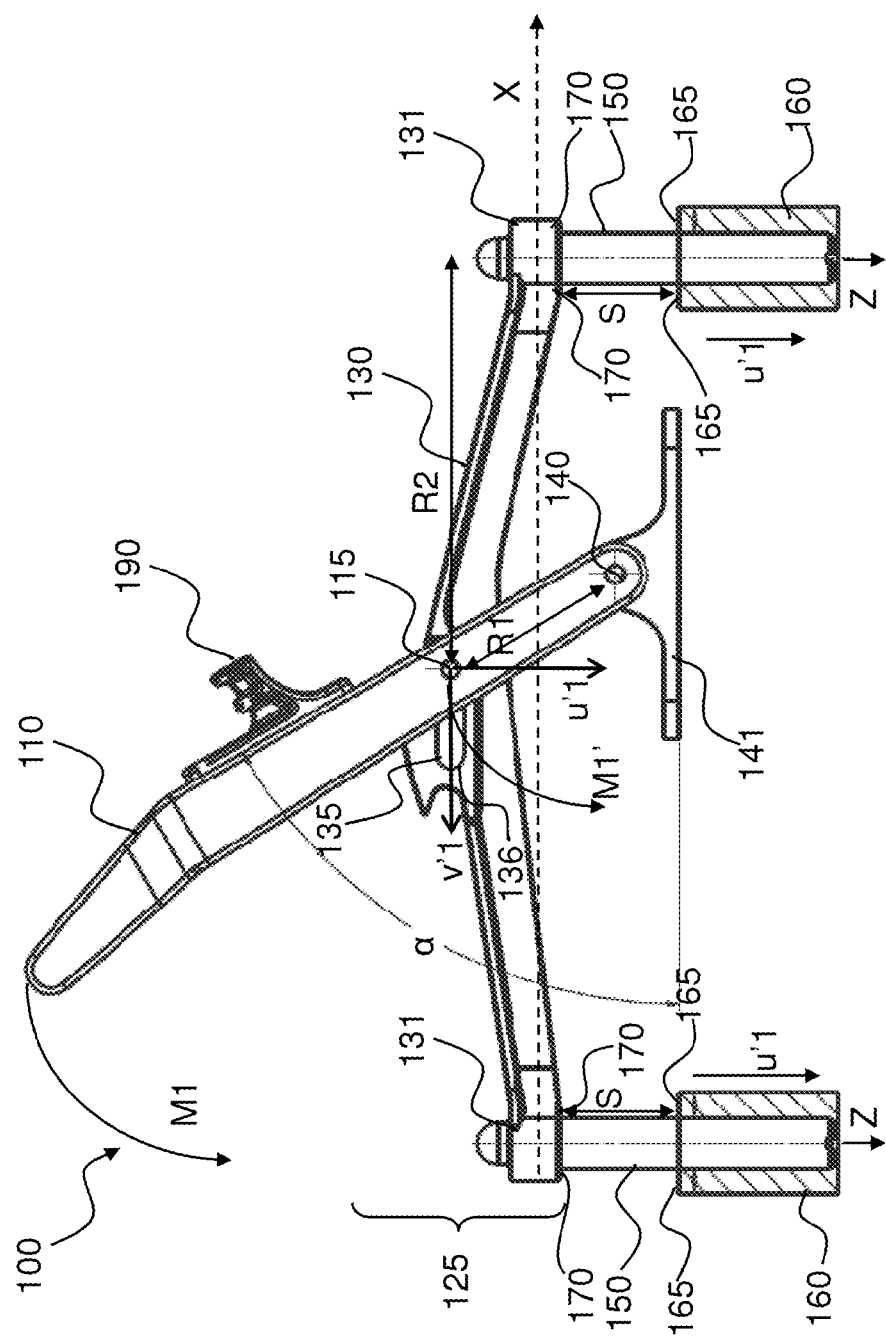
FIG. 1 is a front view illustration of a locking mechanism, in an unlocked position, for securely linking together ladder sections of a telescopic ladder, constructed and operative in accordance with an embodiment of the disclosed technique.
Figure 2:
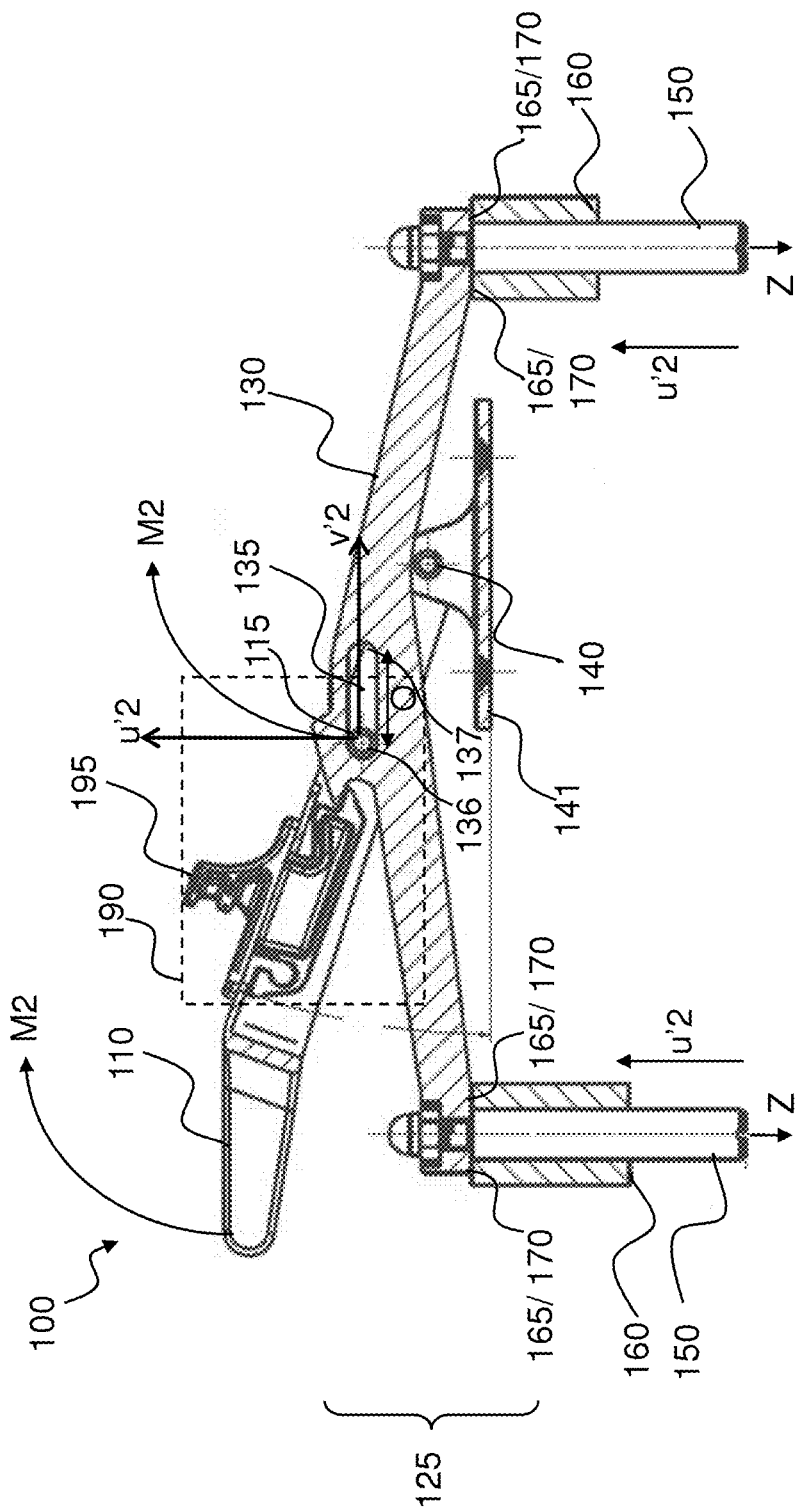
FIG. 2 is a rear view illustration of the locking mechanism of FIG. 1 in a locked position.
Figure 3:
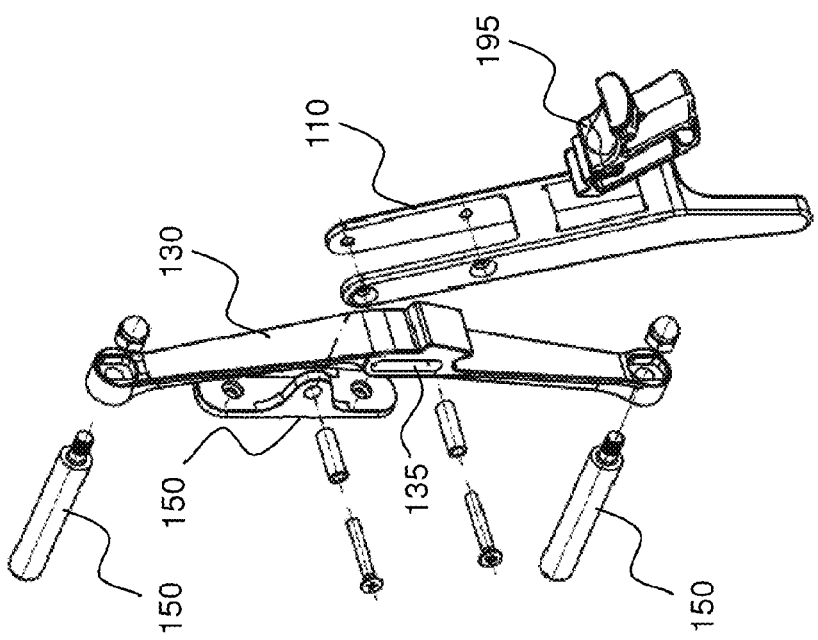
FIG. 3 is a perspective exploded view illustration of the locking mechanism of FIG. 1.

Reference is now made to FIGS. 1, 2 and 3. FIG. 1 is a front view illustration of a locking mechanism, generally referenced 100, in an unlocked position, for securely linking together ladder sections of a telescopic ladder, constructed and operative in accordance with an embodiment of the disclosed technique. FIG. 2 is a rear view illustration of the locking mechanism 100 of FIG. 1 in a locked position. FIG. 3 is a perspective exploded view illustration of the locking mechanism 100 of FIG. 1. As outlined herein below in greater detail, the locking mechanism of the disclosed technique is operative for selectively securing and unsecuring the linkage of one ladder section at a fixed position with respect to another contiguous ladder section of a telescopic ladder. When the linkages are secured, the telescopic ladder may bear a heavy load, for example, up to 300 lbs or approximately 140 kg. An exemplary telescopic ladder of the disclosed technique includes multiple individual ladder sections, for example eight ladder sections.

Locking mechanism 100 includes a lever 110, a pivot-to-linear translation mechanism, and a plurality of securing rods 150. Lever 110 includes a lever-securing mechanism 190 and a lever base 141. As outlined hereinbelow in greater detail, locking mechanism 100 is selectively positionable between a locked position, for securing the linkage between ladder sections, and an unlocked position, for unsecuring the linkage between the ladder sections.

Pivot-to-linear translation mechanism 125 includes a bridge element 130 having a longitudinal axis X, a guiding track 135, and a track follower 115 linearly displaceable along guiding track 135. Track follower 115 may for example be disposed through and confined within guiding track 135. Track follower 115 may for example be implemented by a pivotable coupling element. Guiding track 135 includes a first stopper 136 and a second stopper 137 which define, interjacent, a track length Q. Lever 110 is slidably and pivotably coupled with guiding track 135 by track follower 115 or, otherwise stated, lever 110 is coupled to bridge element 130 via track follower 115. Track follower 115 is fixedly coupled to a middle region of lever 110. Lever base 141 is fixedly coupled to a stile of the telescopic ladder.

In the embodiment of the disclosed technique depicted in FIGS. 1, 2 and 3, bridge element 130 includes guiding track 135 while, correspondingly, track follower 115 is fixedly coupled to lever 110, at a distance R1 from anchor axis 140. In an alternative embodiment of the disclosed technique, lever 110 may instead include guiding track 135, while track follower 115 may be fixedly coupled to bridge element 130, for example, at a distance R2 from securing rods 150.

Figure 7:
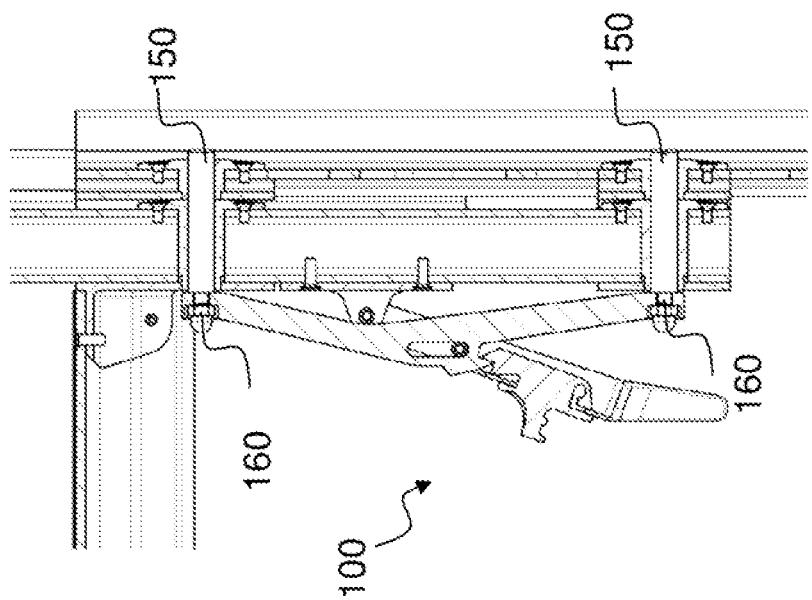
FIG. 7 is a cross-sectional side view illustration of the locking mechanism securing the linkage of a pair of ladder sections, in accordance with an embodiment of the disclosed technique.
Figure 8:
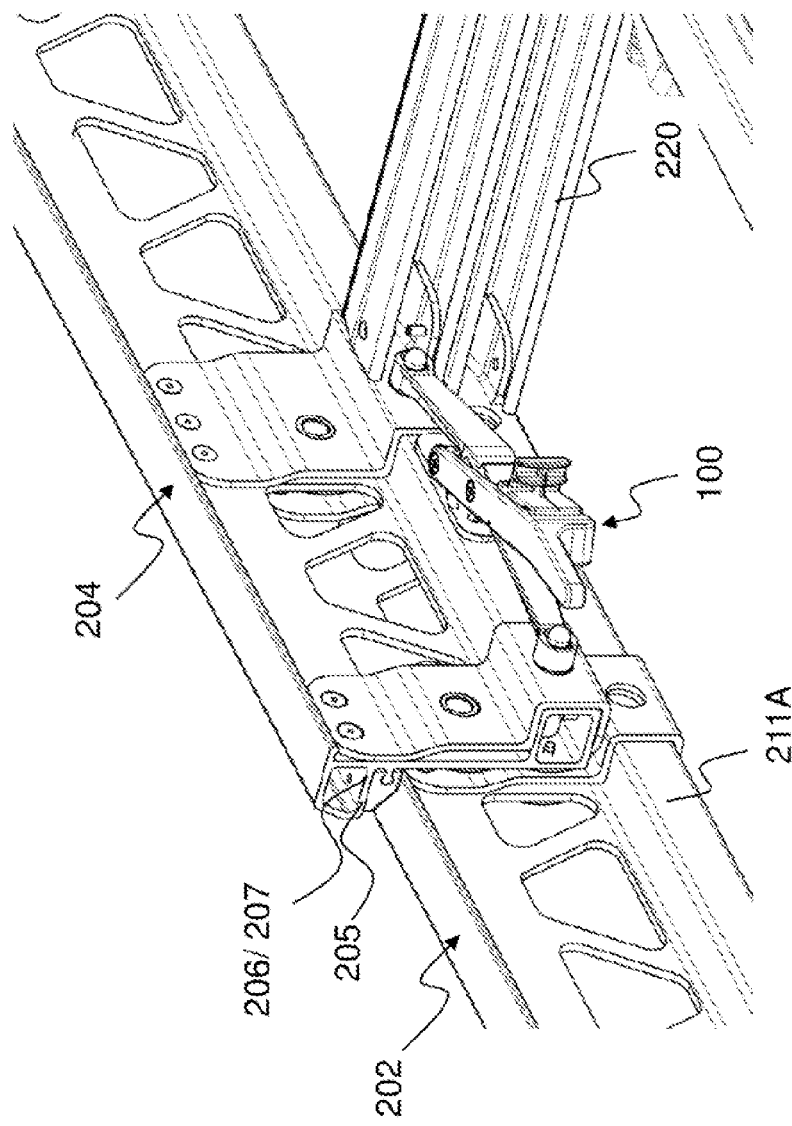
FIG. 8 is a perspective view illustration of the locking mechanism securing the linkage of a pair of ladder sections, in accordance with an embodiment of the disclosed technique.

Each of securing rods 150 are coupled with respective regions of bridge element 130, such that the longitudinal axis Z of securing rods 150 is at least approximately perpendicular to axis X of bridge element 130. For example, one end of each securing rod 150 is coupled to a respective distal end 131 of bridge element 130 (e.g., securing rods 150 are inserted through respective apertures at respective distal ends 131 of bridge element 130 and secured there, e.g., via screws). The other end of each securing rod 150 is confined within a respective bore or aperture (partially depicted as section 160 in FIGS. 1 and 2) that passes through the stiles of multiple ladder sections (as can be seen in FIGS. 7 and 8). Securing rods 150 are selectively displaceable within bores 160, such that the linear displacement of the securing rods 150 in one direction (i.e., extending further into bores 160) results in the securing rods 150 intersecting multiple ladder sections and thereby securing the linkage of those ladder sections, while the linear displacement of the securing rods 150 in the opposite direction (i.e., retracting from bores 160) pulls the securing rods 150 away from the other ladder sections and thereby unsecuring the linkage between the ladder sections. Securing rods 150 are preferably housed within a bushing 162 (FIG. 8) that is inserted into bore 160, to reduce friction and ease the linear displacement of rods 150 within bores 160. Bore shoulder 165 is defined as the edge of bore 160 nearest to bridge element 130. By displaceably confining securing rods 150 in bores 160, and by pivotably anchoring in space, at an anchor axis 140, lever 110 relative to bores 160 such that anchor axis 140 and bores 160 remain stationary with respect to each other, pivot-to-linear translation mechanism 125 translates a reciprocating pivoting movement M1 and M2 of lever 110 into a respectively reciprocating extending or retracting linear displacement (respectively referenced u'1 and u'2) of securing rods 150 within bores 160. Pivoting lever 110 in a trajectory M1 shifts locking mechanism 100 from an "unlocked position" (FIG. 1) into a "locked position" (FIG. 2). Conversely, pivoting lever 110 in a trajectory M2 shifts locking mechanism 100 from the locked position into the unlocked position.

Due to the confinement of securing rods 150 within bores 160, the movement of bridge element 130 is also linearly confined to the longitudinal axis Z of securing rods 150. An engagement area 170 is defined as the lower edge of each distal end 131 of bridge element 130 (where the respective securing rod 150 is coupled). When locking mechanism 100 is in an unlocked position (FIG. 1), engagement areas 170 and bore shoulders 165 are positioned from each other by a distance S. When locking mechanism 100 is in an unlocked position (FIG. 2), engagement areas 170 are engaged with bore shoulders 165.

Referring now to FIG. 1, provided that anchor axis 140 and bores 160 are stationary relative to each other, pivoting lever 110 along rotational trajectory M1 causes track follower 115 to pivot in the same direction as M1 along rotational trajectory M1', which is concentric to M1. Due to the confinement of track follower 115 within guiding track 135, track follower 115 is displaced in a first direction (e.g., toward the left as depicted in FIGS. 1 and 2) along guiding track 135 while following rotational trajectory M1', which in turn, urges the displacement of bridge element 130, and therefore securing rods 150, along longitudinal axis Z (e.g., downwards as depicted in FIGS. 1 and 2). More specifically, rotational trajectory M1' includes two directional components: a horizontal component u'1 and a vertical component v'1 (defined in terms of the alignment of locking mechanism depicted in FIGS. 1 and 2). Otherwise stating, pivoting lever 110 along rotational trajectory M1 causes track follower 115 to traverse a horizontal distance v'1 and a vertical distance u'1. Accordingly, track follower 115 moves towards bores 160 by traversing distance u'1, which is parallel to longitudinal axis Z. Due to the confinement of securing rods 150 within bores 160, securing rods 150 can only be displaced along axis Z. Correspondingly, when pivoting lever 110 along rotational trajectory M1, the direction and magnitude of an extending displacement of securing rods 150 is confined by the vertical component of rotational trajectory M1', namely by path u'1. Thus, rods 150 are displaced according to path u'1 to extend further into bores 160 and intersect multiple ladder sections, thereby securing the linkage of the ladder sections when locking mechanism 100 is locked.

The unlocking operation is analogous to the locking operation but in reverse. Referring now to FIG. 2, pivoting lever 110 along trajectory M2 causes track follower 115 to follow the trajectory M2', which includes a vertical component v'2 and a horizontal component u'2. The path lengths of components v'2 and u'2 are equal to the path lengths of components v'1 and u'1, respectively. In particular, track follower 115 is displaced in a second direction (e.g., toward the right as depicted in FIGS. 1 and 2) along guiding track 135 while following rotational trajectory M2', which in turn, urges the displacement of bridge element 130, and therefore securing rods 150, along longitudinal axis Z according to path u'2 (e.g., upwards as depicted in FIGS. 1 and 2). Accordingly, when locking mechanism 100 is unlocked, rods 150 are displaced according to path u'2 to retract from bores 160 such that rods 150 no longer intersect multiple ladder sections, thereby unsecuring the linkage of the ladder sections.

The extent of the linearly extending/retracting displacement of securing rods 150 may be limited by track length Q and/or by the engagement area-to-shoulder distance S, which is defined as the distance between engagement area 170 and bore shoulders 165 when lever 110 is in an unlocked position. For example, track length Q may define the maximal path length of vertical components u'1 and u'2. More specifically, the horizontal displacement of track follower 115 within guiding track 135 corresponds to the horizontal components v'1 and v'2 of pivoting trajectories M'1 and M'2, respectively, which in turn results in a corresponding vertical displacement of u'1 and u'2 of track follower 115 of the same magnitude, due to the pivotable coupling of lever 110 at anchor axis 140. Consequently, a limitation of the movement of the horizontal displacement v' of track follower 115 in guiding track 135 equally limits the vertical displacement u' of track follower 115, i.e., abs(v')=abs(u'), noting that as outlined hereinabove, the magnitude of displacements u'1 and u'2 of M1 and M2 equals the magnitude of displacements u'1 and u'2 of securing rods 150, respectively. Therefore, in an embodiment where the engagement area-to-shoulder distance S is greater than the maximal horizontal displacement v of track follower 115 in guiding track 135 (S>v), then the maximal displacement v of track follower 115 is limited by the distance between first stopper 136 and second stopper 137.

Considering now for example an embodiment where locking mechanism 100 is configured such that S<v, i.e., the distance between bore shoulders 165 and engagement area 170 is smaller than the maximal distance track follower 115 can traverse within guiding track 135, then the length of vertical (extending) displacement u'1 of securing rods 150 is limited by bore shoulders 165. However, the vertical (retracting) displacement u'2 is limited by second stopper 137. In alternative embodiments of the disclosed technique, distance S and track length Q may be at least approximately equal. Consequently, the length of vertical displacement u'1 of securing rods 150 may both be limited by bore shoulders 165 and first stopper 136, whereas the length of vertical displacement u'2 remains limited by second stopper 137 only.

It is noted that the design and structure of locking mechanism 100 essentially serves to transfer a rotational force applied by the user (i.e., by pivoting lever 110) into a translational force (i.e., the displacement of securing rods 150). Consequently, locking mechanism 100 provides precise operation (i.e., since the alignment of securing rods 150 relative to bores 160 is automatically implemented), as well as comfort of use (i.e., since locking/unlocking only requires the simple and straightforward action of flipping a lever). It is further noted that, when locking mechanism 100 is in the locked position, the ladder sections are secured from being displaced along two separate translational axes and from being rotated along three separate rotational axes, leaving only one degree of freedom (i.e., along axis Z), providing considerable stability as well as a highly balanced load distribution throughout the entire ladder.

Figure 4:
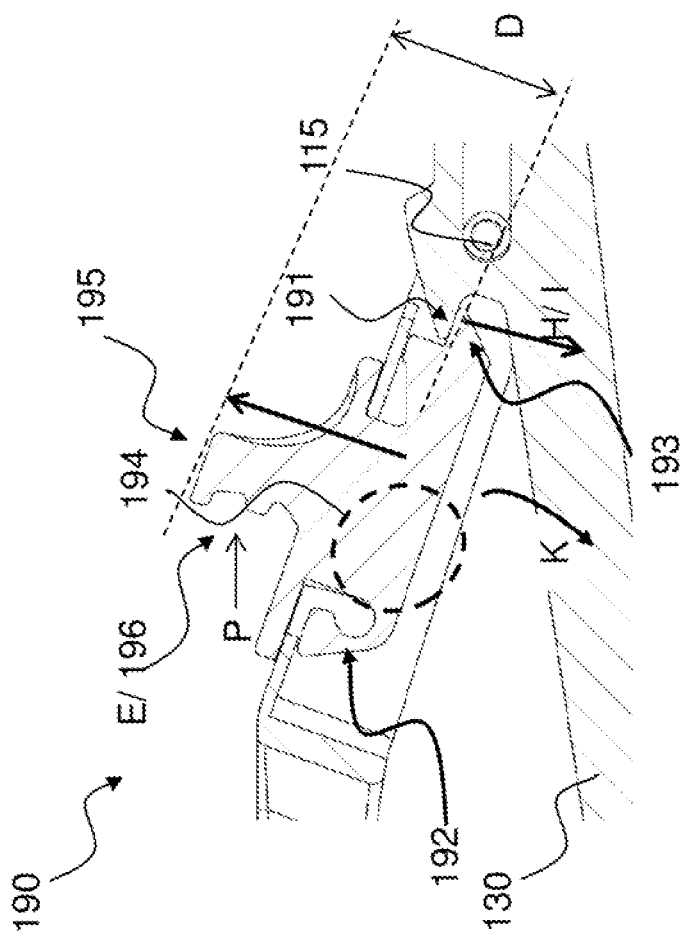
FIG. 4 is an enlarged side-view illustration of a lever-securing mechanism of the locking mechanism of FIG. 1, constructed and operative in accordance with an embodiment of the disclosed technique.

Reference is now made to FIG. 4, which is an enlarged side-view illustration of a lever-securing mechanism 190 of the locking mechanism 100 of FIG. 1, constructed and operative in accordance with an embodiment of the disclosed technique. Lever-securing mechanism 190 is operative to form-fittingly secure lever 110 within bridge element 130 when locking mechanism is in the locked position. Lever-securing mechanism 190 may be implemented, for example, by a snap-lock mechanism, as depicted in FIG. 4. Lever-securing mechanism 190 includes a latch 192 with a snap arm 193 at one end. Bridge element 130 includes a hook portion 191, formed at the edge of a central region of bridge element 130 and situated adjacent to guiding track 135. Hook portion 191 protrudes outwards from bridge element 130, defining a recessed concavity therebetween. In the locked position, the end of latch 192 is positioned relative to hook portion 191 in a manner that prevents lever 110 from freely moving back to the unlocked position. In particular, snap arm 193 of latch 192 is positioned within the recessed concavity formed by hook portion 191. Therefore, when locking mechanism 100 is locked, hook portion 191 prevents lever 110 from pivoting along rotational trajectory M2 by engaging with latch 192, which subjects snap arm 193 to an opposing counterforce H. Thus configured, the snap-lock mechanism that is embodied by hook portion 191 and latch 192 serves to form-fittingly secure lever 110 within bridge element 130.

At least one of hook portion 191 and latch 192 may be flexible to facilitate snap arm 193 to slide underneath hook portion 191 and into the recessed concavity, when pivoting lever 110 to lock locking mechanism 100. Considering for example that latch 192 is flexible and hook portion 191 is formed by a substantially rigid material, then pivoting lever 110 into the locked position causes latch 192 to bend in direction K.

Latch 192 includes a knee-shaped portion 194 which is configured such that snap arm 193 can be easily flexed or bent away from bridge element 130 by hook portion 191 to cause latch 192 to snap into the recessed concavity formed by hook portion 191. On the other hand, knee-shaped portion 194 is configured such that latch 192 may be relatively reinforced against flexing or bending of snap arm 193 against the inner edge of hook portion 191. Accordingly, lever-securing mechanism 190 includes an optional unlocking-assister 195 for providing leverage that facilitates flexing snap arm 193 in the direction K, by applying a force P at point E of a grip 196 of unlocking-assister 195. Due to the distance D between snap arm 193 and point E, leverage is obtained, as opposed to when applying a releasing force I directly on snap arm 193.

Locking mechanism 100 may be configured such that when lever 110 is in the locked position, the user may only be able to unlock lever-securing mechanism 190 by operating unlocking-assister 195. Accordingly, lever-securing mechanism 190 may be configured such that the user is prevented from directly manipulating snap arm 193. It is appreciated that lever-securing mechanism 190 may alternatively be embodied by a different suitable configuration.

Figure 6:
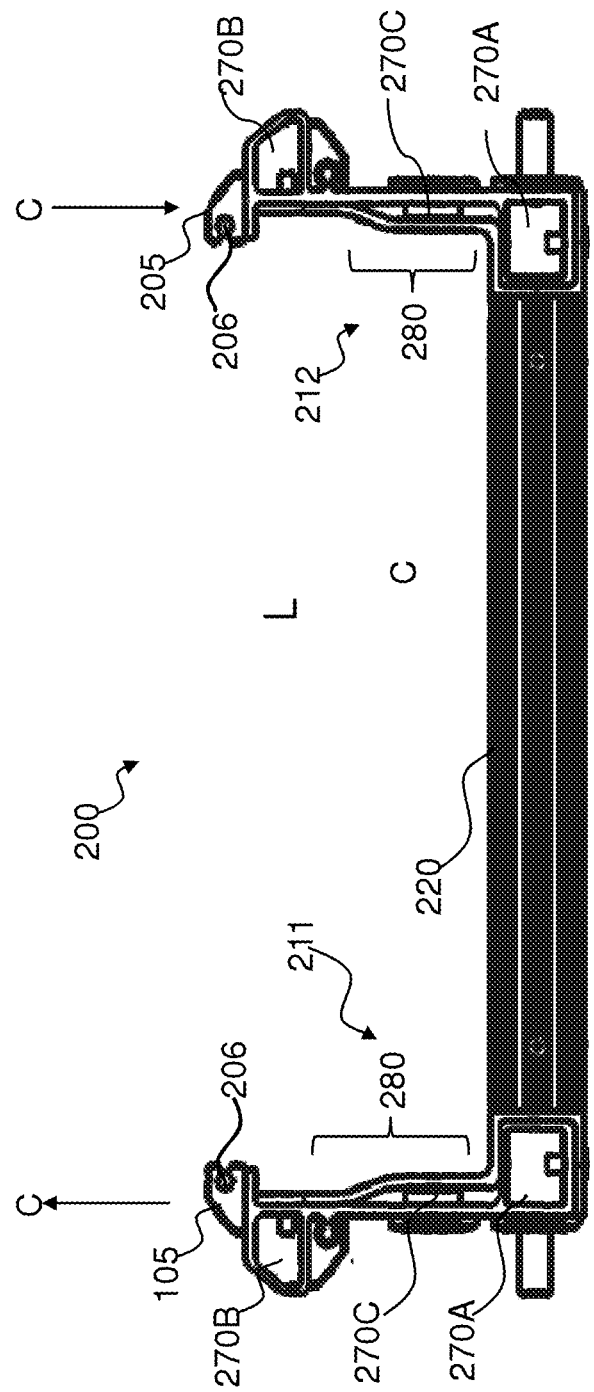
FIG. 6 is a top view illustration of the ladder section of FIG. 5A.
Figure 9:
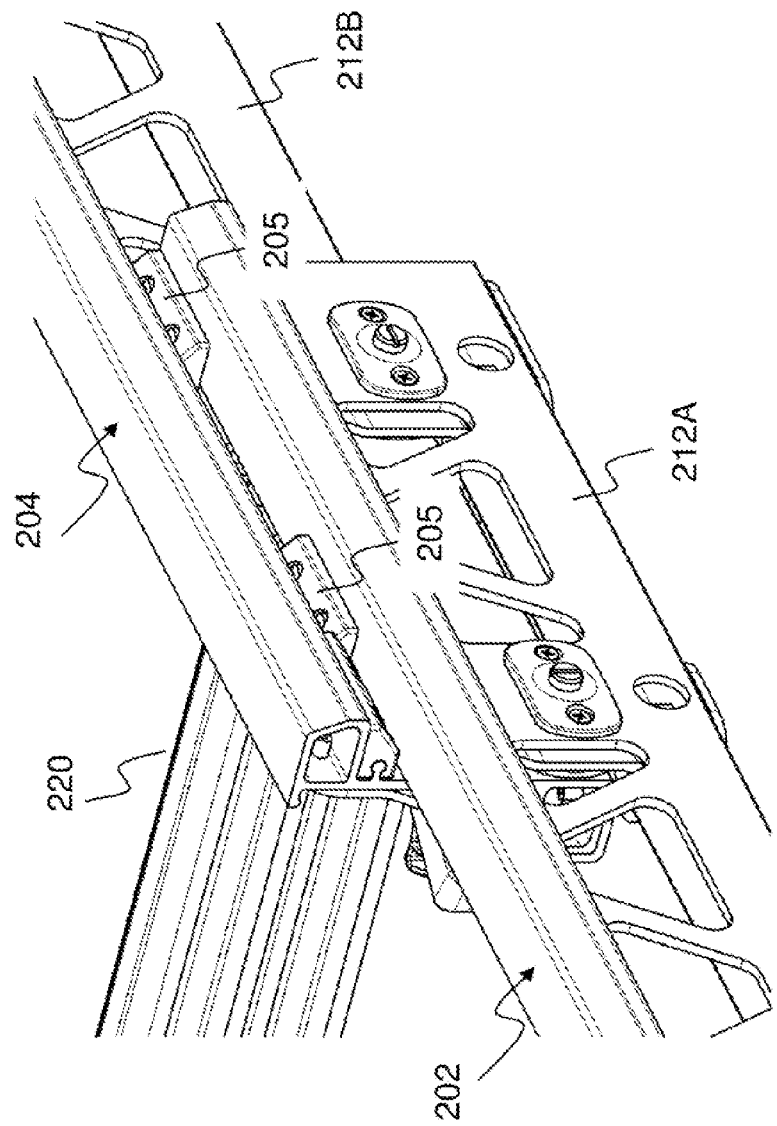
FIG. 9 is an enlarged view illustration of the securely linked ladder sections, in accordance with an embodiment of the disclosed technique.
Figure 10:
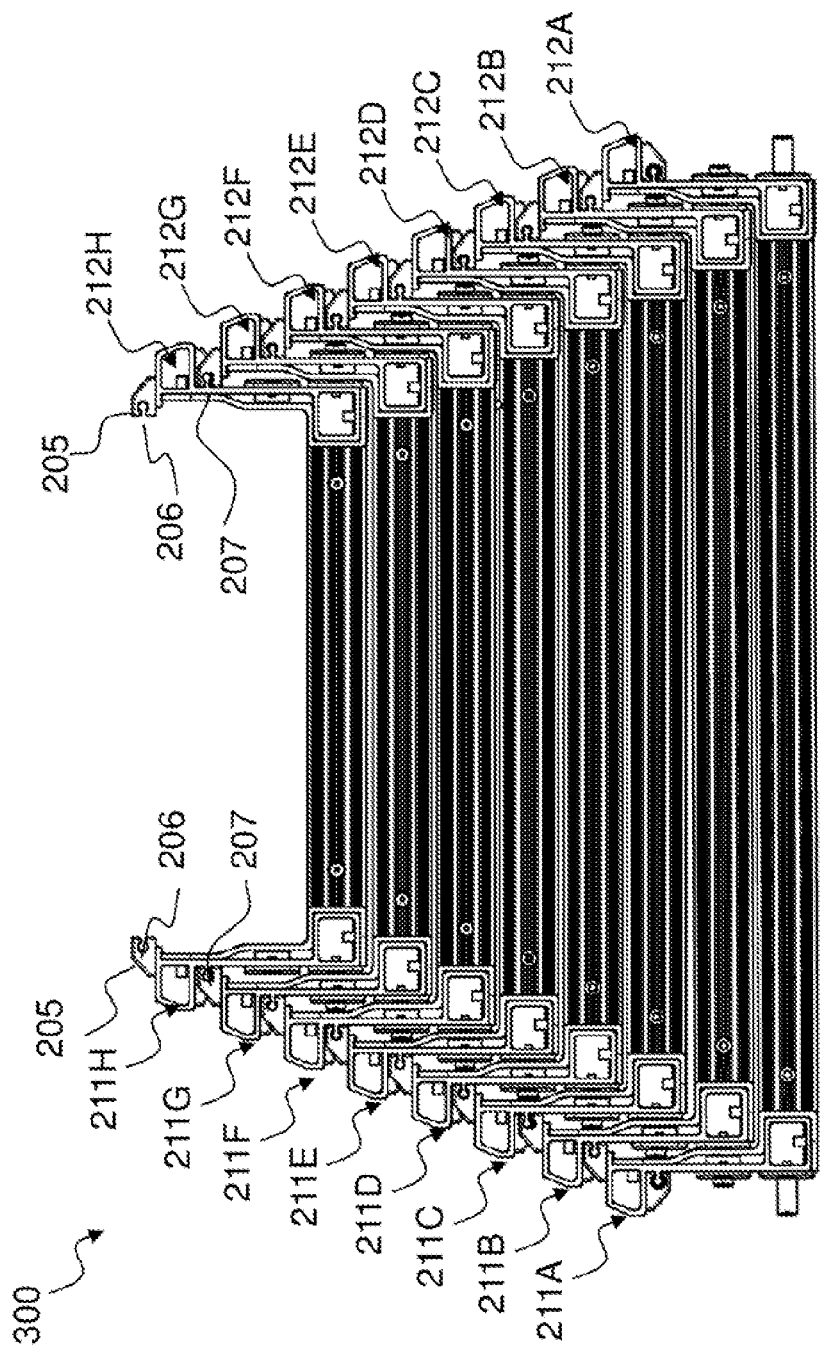
FIG. 10 is a top view illustration of a telescopic ladder in a fully retracted state, in accordance with an embodiment of the disclosed technique.
Figure 11:
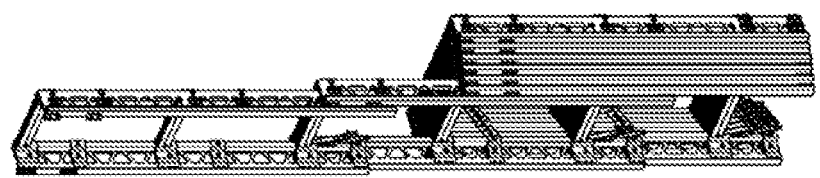
FIG. 11 is a perspective view illustration of a telescopic ladder in a partially extended state, in accordance with an embodiment of the disclosed technique.

Additional reference is now made to FIGS. 5A, 5B, 6, 7, 8, 9 and 10. FIG. 5A is a front view illustration of a ladder section, generally referenced 200, of a telescopic ladder, constructed and operative in accordance with an embodiment of the disclosed technique. FIG. 5B is a perspective disassembled view illustration of the ladder section 200 of FIG. 5A. FIG. 6 is a top view illustration of the ladder section of FIG. 5A. FIG. 7 is a cross-sectional side view illustration of the locking mechanism 100 securing the linkage of a pair of ladder sections, referenced 202 and 204, in accordance with an embodiment of the disclosed technique. FIG. 8 is a perspective view illustration of the locking mechanism 100 securing the linkage of the pair of ladder sections 202, 204, in accordance with an embodiment of the disclosed technique. FIG. 9 is an enlarged view illustration of the securely linked ladder sections 202, 204, in accordance with an embodiment of the disclosed technique. FIG. 10 is a top view illustration of a telescopic ladder, generally referenced 300, in a fully retracted state, in accordance with an embodiment of the disclosed technique. FIG. 11 is a perspective view illustration of a telescopic ladder 300 in a partially extended state, in accordance with an embodiment of the disclosed technique.

Referring to FIGS. 5A and 5B, ladder section 200 includes a pair of stiles 211 and 212 (i.e., the vertical members of the ladder, also known as "stringers") that are joined together by at least one rung 220. A plurality of brackets 214 are affixed onto the inner surface of each stile 211, 212. Some of the brackets 214 include a rung joint 216, at which rungs 220 are joined to stiles 211, 212, such that the ends of each rung 220 are held securely by respective rung joints 216. Locking mechanism 100 is fastened onto the stiles 211, 212 of ladder section 200 via brackets 214. In particular, brackets 204 are securely affixed at selected locations along stiles 211, 212 (e.g., via screws). Each bracket 214 includes at least one aperture 217 which is aligned with an aperture that passes through the ladder stile. Each securing rod 150 of locking mechanism 100 is displaceably confined within the aperture 217 (corresponding to bore 160) of a respective one of two adjacent brackets 214 (e.g., brackets 214A and 214B). Lever base 141 is fastened onto the ladder stile 211, 212 in between the two adjacent brackets 214A and 214B. It is appreciated that brackets 214 serve to increase the rigidity of ladder 200 by further minimizing relative movement between ladder sections. Rung joints 216 also add torsion stiffness to ladder 200, providing additional resistance to twisting forces. In addition, brackets 214 provide further support for bushing 162 (which houses a securing rod 150), such that bushing 162 rests on both the stile 211, 212 and the bracket 214, thereby dispersing the load sustained by the securing rods 150. Brackets 214 also act as reinforcement elements for the cross-sectional profile of stiles 211, 212 (discussed in further detail hereinbelow).

Referring now to FIG. 6, each ladder section 200 may be configured to be resistive to three types of forces: buckling caused by an axial load (A); a bending load (B); and a force couple (C) resulting in the twisting of ladder sections 200. To attain this resistivity, each one of stiles 211 and 212 is configured to exhibit a correspondingly high inertia (I) to buckling, bending and twisting. For example, the cross-sectional profile of each stile 211 and 212 includes at least three separate profile sections defining a tubular cavity extending at least partially along stiles 211 and 212. The profile sections are preferably interconnected. For example, a first corner section 170A is situated adjacent to the outer edge of rung 220 and extends toward the inner side of stile 211, 212. A second corner section 170B is situated at an opposite corner of stile 211, 212 relative to first corner section 170A and extends toward the outer side of stile 211, 212. Corner sections 170A and 170B are each polygon-shaped and hollow. A connective section 170C extends perpendicular to rungs 220 along a lateral axis of stile 211, 212, adjoining first corner section 270A and second corner section 270B. This cross-sectional profile also enables the stiles of an inner ladder section of ladder 200 to be nested within the stiles of an outer ladder section of ladder 200, when the ladder is folded in a fully retracted configuration (as depicted in FIG. 10).

Referring to FIGS. 7, 8, 9, 10 and 11, a first ladder section 202 is slidably coupled with a second, contiguous, ladder section 204, through a respective pair of ladder rails 205 situated on the stiles of first ladder section 202. Ladder rail 205 includes rail grooves 206 configured to complementarily receive a slide strip 207 of the stiles of second ladder section 204. Locking mechanism 100 is mounted onto stile 211B of ladder section 204 via a bracket 214. When locking mechanism 100 is unlocked, ladder section 202 may be displaced relative to ladder section 204 along a longitudinal axis of the ladder 200 in order to extend or retract ladder 200. Ladder section 202 may be linked with ladder section 204 when ladder sections 202 and 204 are aligned in a linkage position, in order to fix ladder 200 at a desired extended/retracted length. More specifically, ladder sections 202 and 204 are aligned in a linkage position when at least one bore 160 of a stile 211A of ladder section 202 is aligned with at least another bore 160 of a stile 211B of ladder section 204. Thusly configured, ladder sections 202 and 204 are securely linked by locking the locking mechanism 100 (i.e., by pivoting lever 110 along rotational trajectory M1), which displaces securing rods 150 to laterally extend through the bores 160 of both stiles 211A and 211B. Once the linkage is secured, locking mechanism prevents relative displacement between the ladder sections 202 and 204 (i.e., along five separate translational/rotational axes, as discussed hereinabove).

Correspondingly, to securely link two contiguous ladder sections 202 and 204, the two ladder sections 202 and 204 first have to be brought into a linkage position by sliding first ladder section 202 relative to second ladder section 204. Ladder sections 202 and 204 may include visible marks to facilitate their alignment into a linkage position.

Lever-securing mechanism 190 of locking mechanism 100 secures lever 110 within bridge element 130 when locking mechanism 100 is in the locked position, preventing the inadvertent pivoting of lever 110 along trajectory M2 and retracting of securing rods 150 from bores 160, and thus preventing the linkage between ladder sections 202 and 204 from being inadvertently unsecured. Accordingly, when locking mechanism 100 is locked, the two ladder sections 202 and 204 are securely linked, while conversely, unlocking locking mechanism 100 unsecures the linkage between ladder sections 202 and 204 and enables their relative displacement in order to extend or retract ladder 200 to a desired length.

Ladder 300 may be configured such that there are multiple linkage positions at which ladder sections 202 and 204 may be aligned. For example, a stile 211A of a first ladder section 202 may include a plurality of bores 160 laterally extending through stile 211A and situated at different positions along the longitudinal axis of stile 211A. Similarly, stile 211B of second ladder section 204 may also include a plurality of bores 160 laterally extending through stile 211B and situated at different positions along the longitudinal axis of stile 211B. Thus, stile 211A may be aligned relative to stile 211B at a plurality of different linkage positions, whereby at each of the linkage positions, locking mechanism 100 is operative to securely link the two stiles 211A and 211B (and thus the two ladder sections 202 and 204) to each other.

The locking mechanism of the disclosed technique preferably includes two securing rods 150, although the locking mechanism may alternatively be implemented with only a single securing rod (e.g., where one end of bridge element 130 is fixedly coupled to the ladder section). It is appreciated that the use of two securing rods serves to minimize freedom of movement between the ladder sections, to improve the load distribution throughout the ladder, and to provide a high weight and high volume load bearing efficiency.

Figures 13A, 13B:
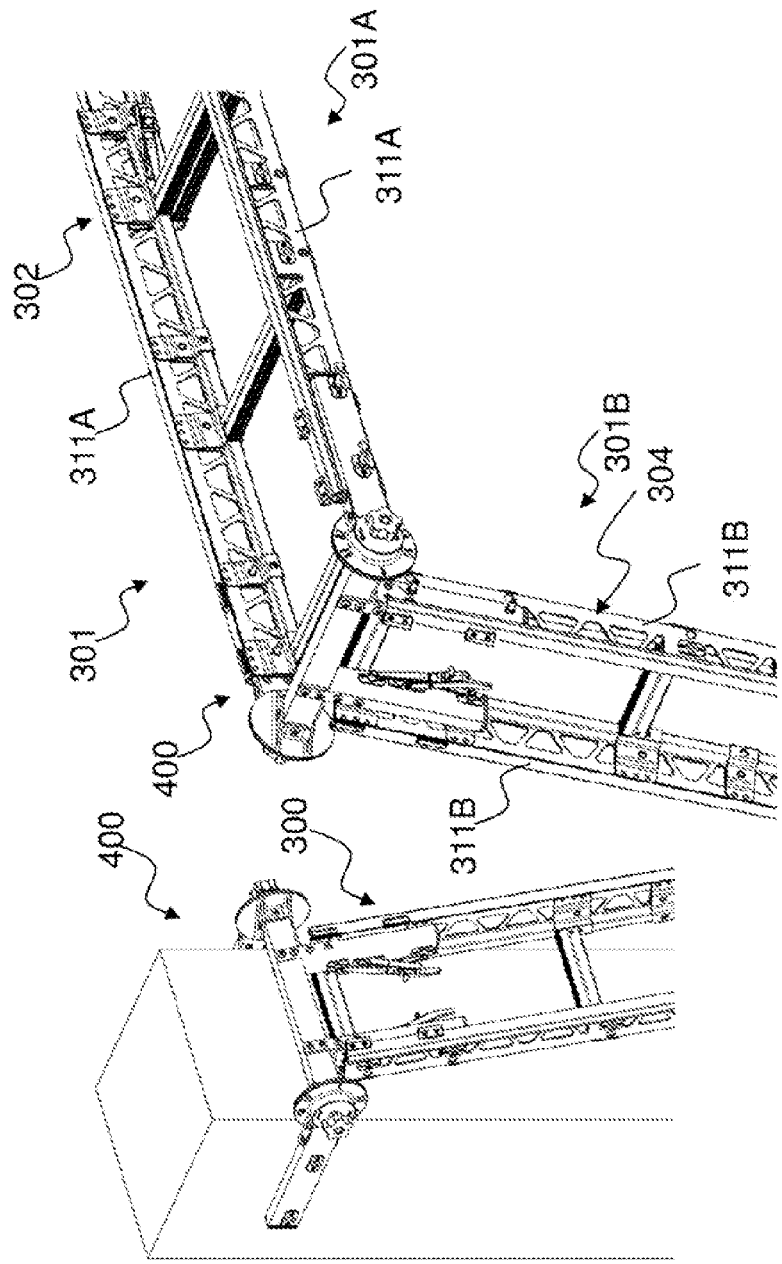
FIG. 13A is a perspective view illustration of the head adapter coupled with a telescopic ladder and clasped onto a supporting post, constructed and operative in accordance with an embodiment of the disclosed technique.
FIG. 13B is a perspective view illustration of the head adapter coupled at each end with separate ladder sections of a telescopic ladder, constructed and operative in accordance with an embodiment the disclosed technique.

Reference is now made to FIGS. 12A, 12B, 13A and 13B. FIG. 12A is a perspective view illustration of a head adapter, generally referenced 400, for a telescopic ladder 300, where the head adapter is in an unfolded position, constructed and operative in accordance with an embodiment of the disclosed technique. FIG. 12B is a perspective view illustration of the head adapter 400 in a folded position, constructed and operative in accordance with an embodiment of the disclosed technique. FIG. 13A is a perspective view illustration of the head adapter 400 coupled with a telescopic ladder 300 and clasped onto a supporting post, constructed and operative in accordance with an embodiment of the disclosed technique. FIG. 13B is a perspective view illustration of the head adapter 400 coupled at each end with separate ladder sections 302, 304 of a telescopic ladder 300, constructed and operative in accordance with an embodiment the disclosed technique. Head adapter 400 includes a first "pi-shaped" section 410 (i.e., resembling the shape of the mathematical symbol π) defined by a first pair of outer legs 411A and 411B that are coupled with each other by a hinge 440. Head adapter 400 further includes a second pi-shaped section 420 defined by a second pair of inner legs 412A and 412B coupled with each other by hinge 440. First pair of legs 411A and 411B is coupled with hinge 440 such that legs 411A and 411B are individually pivotable relative to second pair of legs 412A and 412B about a rotational axis U. Furthermore, the distance between the first pair of legs 411A and 411B may be larger than the distance between the second pair of legs 412A and 412B. Accordingly, first pair of legs 411A and 411B may be rotated relative to the second pair of legs 412A and 412B such that the second pair of legs 412A and 412B are nested between the first pair of legs 411A and 411B. Head adapter 400 may have a weight of, for example, less than 3 kg, less than 2.5 kg, or less than 2.4 kg.

Head adapter 400 is operative for enabling first pair of legs 411A and 411B to be rotated and secured into at least one angular position relative to the second pair of legs 412A and 412B. Head adapter 400 may for example include a rotational securing arrangement 450 that is operative to selectively secure and unsecure the first pair of legs 411A and 411B in at least one predetermined angular position relative to the second pair of legs 412A and 412B. Rotational securing arrangement 450 may be implemented, for example, by a rotatable handle 451 (e.g., a knob) and a fastener 452 (e.g., a screw).

Rotatable handle 451 is fixedly coupled with a distal end of fastener 452 such as to allow a user to rotate handle 451, resulting in the rotation of fastener 452 about axis U. Furthermore, fastener 452 is rotatably coupled with hinge 440, such that clockwise and counterclockwise rotations of handle 451 in respective directions T1 and T2 about axis U results in the linear displacement of both handle 451 and fastener 452 in the respective directions S1 and S2.

Rotational securing arrangement 450 further includes two pairs of securing discs 460 arranged at respective distal ends of hinge 440. Each pair of securing discs 460 includes a first disc 460A and a second disc 460B. First disc 460A is fixedly coupled (e.g., integrally formed) at respective distal ends of hinge 440. Accordingly, first discs 460A are stationary with respect to hinge 440. Second disc 460B is rotatable with respect to first disc 460A. Second disc 460B may be integrally formed with the corresponding outer leg 411B.

The surfaces of first disc 460A and second disc 460B facing each other are provided with at least one tenon 461 and at least one groove 462, respectively. Tenons 461 and grooves 462 may radially extend at least approximately perpendicular to rotational axis U, and are arranged such that tenons 461 can engage grooves 462 to form-fittingly secure the first pair of legs 411A and 411B relative to the second pair of legs 412A and 412B with respect to rotation about axis U.

Fastener 452 is disposed through second disc 460B such that the rotational axis of fastener 452, second disc 460B, and hinge 440 are at least approximately in alignment with one another. Second disc 460B is positioned between handle 451 and first disc 460A. Thusly configured, clockwise rotation of handle 451 causes the linear displacement of handle 451 in a direction S1 towards hinge 440, which in turn enables the application of force F against second disc 460B, resulting in the abutment of second disc 460B against first disc 460A.

When tenons 461 and grooves 462 are in alignment and second disc 460B is forced against first disc 460A, the rotation of second disc 460B relative to first disc 460A is blocked. Accordingly, first pair of legs 411A and 411B and second pair of legs 412A and 412B are secured at a fixed angular position.

Therefore, when first pair of legs 411A and 411B are, for example, set to form an angle β (e.g., at least approximately 100°, 110° or) 120° relative to second pair of legs 412A and 412B, in which tenons 461 and grooves 462 are aligned with each other, then the first pair of legs 411A and 411B may be rotatably secured at a fixed angular position relative to the second pair of legs 412A and 412B by setting rotational securing arrangement 450 into a securing mode, by applying via handle 451 a force F against second disc 460B when first disc 460A abuts second disc 460B. Conversely, first disc 460A may be relieved from force F by rotating handle 451 in a counterclockwise direction T1 resulting in linear displacement S2 of handle 451 and fastener 452, causing first pair of legs 411A and 411B to become rotationally unsecured relative to second pair of legs 412A and 412B. Accordingly, head adapter 400 may be utilized to allow a first ladder 301A to pivot with respect to a second ladder 301B. Rotational securing arrangement 450 may secure first ladder 301A at a fixed angular position with respect to second ladder 301B.

Locking mechanism 100 may be used to securely couple head adapter 400 with a ladder section. For example, head adapter 400 may be coupled via at least one locking mechanism 100 with a corresponding distal end of a telescopic ladder combination 301 including a plurality of telescopic ladders (e.g., a first telescopic ladder 301A and a second telescopic ladder 301B). More specifically, the first pair of legs 411A and 411B may be coupled with the one or two ladder sections 302 and 304 that constitute the end-members of a telescopic ladder combination 301. These end-members are hereinafter referred to as "first ladder section" 302 and "last ladder section" 304. For example, the distance between the first pair of legs 411A and 411B may be wider than the distance between the stiles 311A respective of first ladder section 302. Correspondingly, the first pair of legs 411A and 411B may be coupled with the distal end of first ladder section 302, for example, in a manner such that the first pair of legs 411A and 411B engages with the outer surface of corresponding stiles 311A of first ladder section 302. Conversely, the distance between second pair of legs 412A and 412B may be narrower than the distance between the stiles 311B of the last ladder section 304 of telescopic ladder 300. Accordingly, the second pair of legs 412A and 412B may be coupled with the stiles of last ladder section 304 such that second pair of legs 412A and 412B engages with the inner surface of corresponding stiles 311B of last ladder section 304. Alternatively, both first pair of legs 411A and 411B and second pair of legs 412A and 412B may be configured to be either wider or narrower than stiles 311A and stiles 311B. According to an embodiment of the disclosed technique, locking mechanism 100 may be coupleable to respective first pair of legs 411A and 411B and/or second pair of legs 412A and 412B and head adapter 400, or, alternatively, to the respective pair of stiles of the first ladder section 302 and/or last ladder section 304.

According to an embodiment of the disclosed technique, telescopic ladder 300 may be provided with a base adapter configured and operative to provide telescopic ladder 300 increased engagement stability with a support surface 600. Reference is now made to FIGS. 14A, 14B and 14C. FIG. 14A is a perspective view illustration of a base adapter, generally referenced 500, coupled with a telescopic ladder 300, constructed and operative in accordance with an embodiment of the disclosed technique. FIG. 14B is a detailed perspective view illustration of a grip-element, generally referenced 530, of the base adapter 500 of FIG. 14A, the grip-element 530 being in a retracted position. FIG. 14C is a detailed perspective view illustration of a grip-element 530 of the base adapter 500 of FIG. 14A, the grip-element 530 being in an extended position.

Base adapter 500 includes a support bar 510, at least two connecting arms 520, and a plurality of grip elements 530. Connecting arms 520 are coupled to support bar 510 and extend at least approximately perpendicularly from support bar 510. As is schematically illustrated in FIG. 14A, connecting arms 520 are preferably positioned at least approximately symmetrically along the length of support bar 510. For example, each connecting arm 520 is positioned approximately a third of the way along the full length of support bar 510 between the respective distal ends 511A and 511B (i.e., such that connecting arms 520 trisect support bar 510). Grip element 530 is fixedly coupled at respective distal ends 511A and 511B of support bar 510. Base adapter 500 may have a weight of, e.g., less than 2 kg, or less than 1.6 kg.

Grip element 530 may for example be implemented by a hard-surface grip element 532 including, for example, a rubber-based material having a convex-shaped engagement surface 533, which may be corrugated, providing base adapter 500 with anti-slipping properties over a range of angles γ which base adapter 500 may form with support surface 600. Additionally or alternatively, each grip element 530 may include a soft-surface grip element 534, which includes a retractable spike 541, a spike holder 542, and a spike-retracting element 537. When extended toward the ground surface 600, spike 541 provides increased grip of the telescopic ladder 300 against the ground surface 600, particularly with soft terrain or low-friction surfaces. Spike 541 is integrally formed with a security pin 535 which extends at least approximately perpendicularly from the body of spike 541. Spike holder 542 includes a pin-guiding slit 545 formed in the hollow body of spike holder 542 and which has a vertical slit portion 543 extending along a substantial portion of spike holder 542 and a horizontal slit-portion 544. Spike holder 542 is fixedly coupled to support bar 510.

Spike-retracting element 537 is positioned between the head of spike 541 and the shoulders of spike holder 542. Spike-retracting element 537 is configured such that when security pin 535 is within vertical slit portion 543, spike-retracting element 537 forces spike 541 to displace along direction Q (e.g., upwards) to retract spike 541 away from the ground surface 600. Accordingly, spike 541 is normally retracted from the ground. Spike-retracting element 537 may be implemented by any resilient element, e.g., as known in the art, such as, for example, a compression spring arranged between spike shoulder 545 and holder shoulder 546. To secure spike 541 in the extended position, security pin 535 may be positioned to engage with horizontal slit-portion 544, thereby impeding the displacement of spike 541 (FIG. 14C). Spikes 541 are optional, but particularly helpful when using ladder 300 on low-friction surfaces.

In analogy to what has been outlined hereinabove with respect to head adapter 400, locking mechanism 100 may be used to securely couple base adapter 500 with a ladder section. For example, locking mechanism 100 may be mounted onto connecting arms 502 of base adapter 500, or onto the stiles of a ladder section of ladder 300, for coupling base adapter onto the base of the ladder section.

Figure 15B:
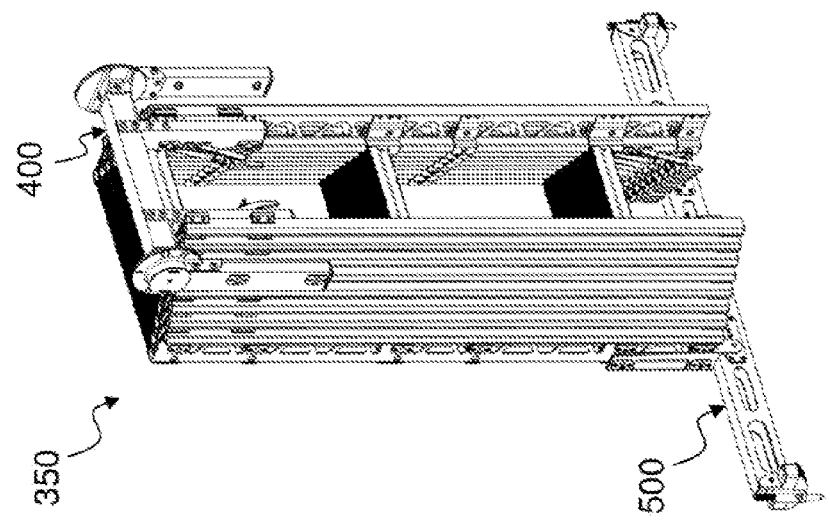
FIG. 15B is a perspective view illustration of the telescopic ladder of FIG. 15A in a fully retracted state.
Figure 15A:
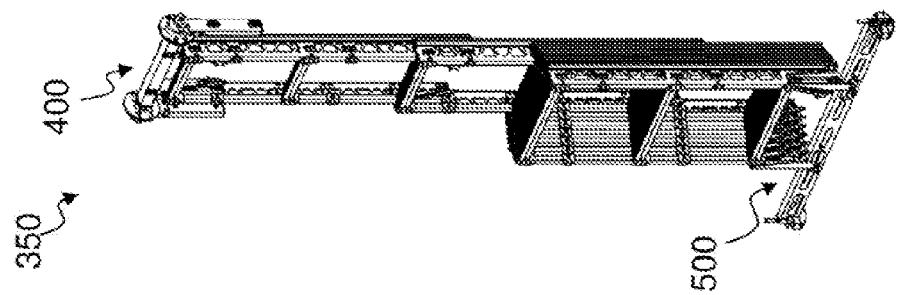
FIG. 15A is a perspective view illustration of a telescopic ladder in a partially extended state and including a head adapter and a base adapter, constructed and operative in accordance with another embodiment of the disclosed technique.
Figure 16:
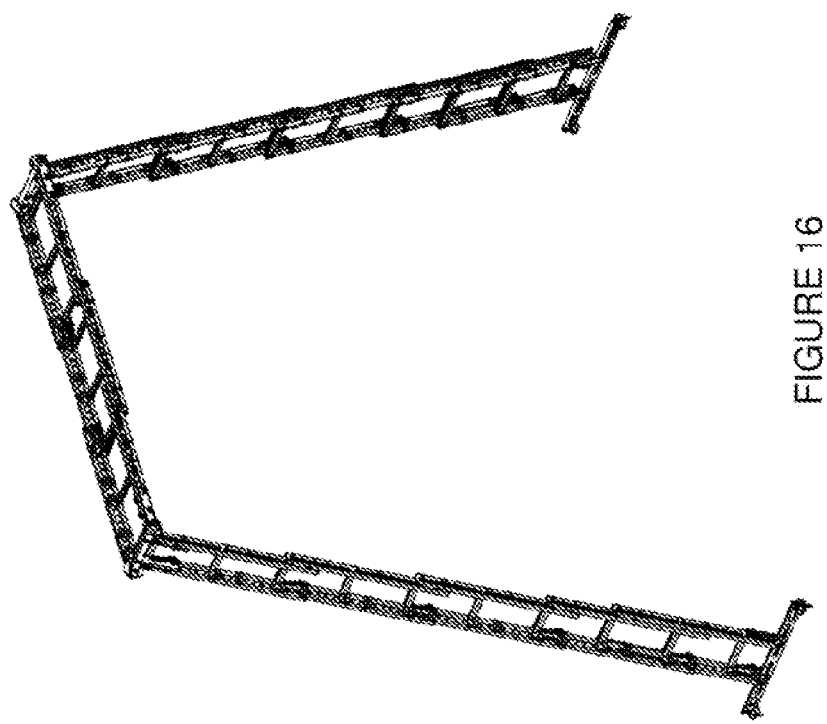
FIG. 16 is a perspective view illustration of a telescopic ladder assembly in a bridge configuration, in accordance with an embodiment of the disclosed technique.

Reference is now made to FIG. 15A, FIG. 15B and FIG. 16. FIG. 15A is a perspective view illustration of a telescopic ladder, generally referenced 350, in a partially extended state and including a head adapter 400 and a base adapter 500, constructed and operative in accordance with another embodiment of the disclosed technique. FIG. 15B is a perspective view illustration of the telescopic ladder 350 of FIG. 15A in a fully retracted state. FIG. 16 is a perspective view illustration of a ladder assembly, generally referenced 800, in a bridge configuration, in accordance with an embodiment of the disclosed technique. Multiple ladder sections may be coupled with each other via head adapter 400, which may be detachably or fixedly coupled to at least one distal end of a given telescopic ladder (e.g., at the top end of telescopic ladder 350). For example, a plurality of telescopic ladders may be coupled with each other to form a ladder assembly 800 which resembles a bridge-like configuration. The height of such a bridge configuration may be, for example, up to about 3.5 meters, while the horizontal component of the bridge configuration may have a length of, e.g., up to about 3 meters.

It should be noted that the cross-sectional profile of stiles 211 and 212 outlined hereinabove with respect to FIG. 5A and FIG. 6 provides high twist resistance, which is of particular importance for ensuring stability of the bridge configuration schematically illustrated in FIG. 16.

The design and configuration of the ladder sections of the disclosed telescopic ladder provides sturdiness and enhanced transportability, due to the light weight and compact dimensions of the ladder when fully retracted. For example, the dimensions of a fully retracted telescopic ladder which includes eight ladder sections may be, e.g., about 100 cm in height (corresponding to the length of a single ladder section), about 40 cm in width (corresponding to the width of the ladder section having the largest distance between the two stiles) and about 30 cm in depth. When fully extended, the telescopic ladder may have a total span of, for example, up to about 7 meters and provide sufficient stability to overcome a height of, e.g., about 4 meters. The increment by which a first ladder section of about 100 cm is extendable with respect to the contiguous second ladder section may range, for example, from about 40 cm to about 60 cm. The weight of the ladder is, for example, less than 20 kg.

The ladder of the disclosed technique is extendable and retractable to different heights to match the required task. It should further be noted that the ladder sections may be securely linked when in either a fully retracted state, a partially extended state, or a fully extended state. For example, a first ladder section may be extended only up to about a half of its own length with respect to a second ladder section and secured in that position. Furthermore, a user may choose to take only the necessary number of ladder sections for the required task, in order to minimize carrying weight when transporting the ladder to the destination. For example, a task requiring ladder use at a relatively lower height would likely necessitate fewer ladder sections (e.g., two or three), allowing the user to avoid unnecessarily transporting all of the ladder sections of the ladder. The ladder of the disclosed technique may be utilized in either a leaning configuration (i.e., where the ladder is leaned against a wall, door or other vertically aligned surface), a bridge configuration (e.g., as in FIG. 16), or a hanging configuration (i.e., where the ladder is suspended from the head adapter). The ladder of the disclosed technique also features rapid deployment, and adaptability for overcoming obstacles of various sizes.

According to an embodiment of the disclosed technique, the telescopic ladder sections may have a non-reflective surface of, e.g., a tan-like colour. Furthermore, the ladder sections may be corrosion-resistant. The ladder sections may be made of, for example: magnesium, aluminium, titanium, fiberglass, or any other suitable material. Additionally or alternatively, the surface of the ladder sections may be treated to render the ladder sections corrosion resistant. Such surface treatments may include, for example: coating or painting of the ladder sections with anti-corrosion material, anodizing, or galvanizing.

It should be noted that although embodiments of the locking mechanism is disclosed in connection with ladders, this should by no means be construed as limiting. Accordingly, a locking mechanism according to the disclosed technique may be employed in connection with non-ladder applications to selectively secure and unsecure the linkage between, for example: individual sections of a pergola, scaffolding, a rack, a skeleton, a truss, a stage, a trestle, a mounting, a stand, a stage, a skid, or any other framework elements.

It should further be noted that although the particular cross-sectional profile is disclosed in connection with ladder stiles, this should by no means to be construed as limiting. Accordingly, such a cross-sectional profile may be applied to any kind of framework element, including but not limited to, for example: a pergola, scaffolding, a rack, a skeleton, a truss, a stage, a trestle, a mounting, a stand, a stage and/or skid elements.

It will be appreciated by persons skilled in the art that the disclosed technique is not limited to what has been particularly shown and described hereinabove.

The invention claimed is:

1. A locking mechanism for selectively securing and unsecuring a linkage of individual ladder sections of a telescopic ladder, said telescopic ladder having stiles, and said telescopic ladder being extendable or retractable by sliding said ladder sections relative to one another along a longitudinal axis of said ladder, said locking mechanism comprising:
   a bridge element, a longitudinal axis of said bridge element aligned along the longitudinal axis of said ladder;
   a lever base, configured to be fixedly coupled to one of said stiles;
   a lever, pivotably coupled about an axis perpendicular to the longitudinal axis of said bridge element and pivotably coupled to said lever base about an anchor axis;
   a guiding track;
   a track follower, which is linearly displaceable along said guiding track;
   wherein each of said guiding track and said track follower is fixedly coupled to a respective one of: said bridge element, and said lever;
   at least two securing rods, coupled to respective distal ends of said bridge element on either side of said lever base, said securing rods aligned in parallel to one another, each of said securing rods configured to be displaceably confined within a respective bore in apertures that pass through the stiles of a plurality of said ladder sections; and
   a lever-securing mechanism, configured to form-fittingly secure said lever within said bridge element,
   wherein said locking mechanism is shifted into a locked position by pivoting said lever toward a first rotational trajectory, urging said track follower in a first direction along said guiding track, and linearly displacing said securing rods into respective ones of said apertures through multiple ladder sections, securing the linkage of said ladder sections, said lever-securing mechanism form-fittingly securing said lever within said bridge element when said locking mechanism is in a locked position, and
   wherein said locking mechanism is shifted into an unlocked position by pivoting said lever toward a second rotational trajectory opposite said first rotational trajectory, urging said track follower in an opposite direction along said guiding track, and linearly displacing said securing rods out from said apertures through said multiple ladder sections, unsecuring the linkage of said ladder sections.

2. The locking mechanism of claim 1, wherein said lever-securing mechanism comprises a snap-lock mechanism.

3. The locking mechanism of claim 1, wherein said lever-securing mechanism comprises:
   a latch, comprising a snap arm at one end thereof; and
   a bridge element, comprising a hook portion that protrudes outwards and defines a recessed concavity,
   wherein said snap arm is positioned within said recessed concavity and said hook portion engages said latch to prevent said lever from pivoting, when said locking mechanism is in a locked position.

4. The locking mechanism of claim 3, wherein said lever-securing mechanism further comprises an unlocking assister, operative to apply leverage onto said snap arm to unlock said locking mechanism.

5. The locking mechanism of claim 1, wherein said locking mechanism is operative for selectively securing and unsecuring the linkage of framework element sections.

6. A telescopic ladder comprising at least one locking mechanism according to claim 1 mounted onto of said at least one stile, for selectively securing and unsecuring the linkage of individual ladder sections of said ladder.

7. The telescopic ladder of claim 6, further comprising at least one bracket mounted onto at least one of said stiles, said bracket comprising at least one aperture aligned with an aperture that passes through said stile, wherein said locking mechanism is coupled to said stile via said bracket, such that said securing rods are displaceably confined within said aperture of said bracket.

8. The telescopic ladder of claim 6, wherein at least one of said stiles of at least one of said ladder sections comprises ladder rails, operative to complementary receive a stile of another one of said ladder sections while enabling linear displacement of said stiles relative to one another when said locking mechanism is in an unlocked position.

9. The telescopic ladder of claim 6, further comprising a head adapter, operative to enable a first ladder section to pivot with respect to a second ladder section, said head adapter comprising:
   a first pair of legs, coupleable to the stiles of said first ladder section;
   a second pair of legs, coupleable to the stiles of said second ladder section;
   a hinge, pivotably coupling said first pair of legs and said second pair of legs; and
   a rotational securing arrangement, operative for securing said first pair of legs and said second pair of legs at a fixed angular position.

10. The telescopic ladder of claim 9, wherein at least one of said first pair of legs and said second pair of legs is coupled to respective said stiles via the locking mechanism.

11. The telescopic ladder of claim 9, wherein a respective said head adapter is coupled to a respective distal end of multiple ladder sections of said ladder, to form a ladder assembly in a bridge configuration.

12. The telescopic ladder of claim 6, further comprising a base adapter, operative to provide said ladder with increased engagement stability on a ground surface, said base adapter comprising:
   a support bar, resting on the ground surface;
   connecting arms, extending perpendicularly from said support bar, said connecting arms coupleable to the stiles of a ladder section of said ladder; and
   grip elements, fixedly coupled at respective distal ends of said support bar, said grip elements operative to securely grip the ground surface.

13. The telescopic ladder of claim 12, wherein at least one of said grip elements comprises a rubber material with a convex-shaped engagement surface.

14. The telescopic ladder of claim 12, wherein at least one of said grip elements comprises a spike, selectively displaceable to extend toward or retract from the ground surface.

15. The telescopic ladder of claim 12, wherein said connecting arms are coupled to respective said stiles via the locking mechanism.

16. The telescopic ladder of claim 6, wherein said ladder comprises a non-reflective surface.

17. The telescopic ladder of claim 6, wherein said ladder comprises a corrosion resistant surface.

* * * * *